(12) United States Patent
Bigo et al.

(10) Patent No.: US 7,150,150 B2
(45) Date of Patent: Dec. 19, 2006

(54) OPEN HYDRAULIC CIRCUIT INCLUDING A RELIEF VALVE DEVICE

(75) Inventors: Louis Bigo, Compiegne (FR);
Jean-Pierre Lebrun, Monceaux (FR);
Jean-Philippe Raisin, Gouvieux (FR);
Eric Gest, Compiegne (FR)

(73) Assignee: Poclain Hydraulics Industrie, Verberie (FR)

( * ) Notice: Subject to any disclaimer, the term of this patent is extended or adjusted under 35 U.S.C. 154(b) by 101 days.

(21) Appl. No.: 10/953,011

(22) Filed: Sep. 29, 2004

(65) Prior Publication Data
US 2005/0109026 A1 May 26, 2005

(30) Foreign Application Priority Data
Oct. 3, 2003 (FR) .................................. 03 11596

(51) Int. Cl.
*F15B 11/02* (2006.01)
*E02F 9/22* (2006.01)
*E02F 9/12* (2006.01)
*E02F 9/08* (2006.01)

(52) U.S. Cl. ........................................ 60/468; 60/493

(58) Field of Classification Search ................. 60/466, 60/488, 493
See application file for complete search history.

(56) References Cited

U.S. PATENT DOCUMENTS 5,197,283 A * 3/1993 Kagiwada et al. ............ 60/493
5,419,132 A * 5/1995 Sato et al. .................... 60/493
5,897,176 A * 4/1999 Dvorak et al. ............... 303/151

FOREIGN PATENT DOCUMENTS

| EP | 0 089 412 | 9/1983 |
|---|---|---|
| FR | 2 781 532 | 1/2000 |
| GB | 2 112 910 | 7/1983 |

* cited by examiner

Primary Examiner—Thomas E. Lazo
(74) Attorney, Agent, or Firm—Ladas & Parry LLP

(57) ABSTRACT

The circuit includes a main pump, a hydraulic motor, two main ducts, a selector for connecting the main ducts to the main pump or to a reservoir or for isolating them therefrom, a boost duct, and two pressure limiters disposed between the main ducts. A relief valve device that can take up a retention position and a relief position in which it connects one main duct (14, 16) to a relief enclosure can take up its relief position when, with the selector isolating the main ducts from the main pump and from the reservoir, the difference between the pressure in the main duct to which the control duct is connected and a relief pressure higher than the boost pressure changes sign.

20 Claims, 6 Drawing Sheets

OPEN HYDRAULIC CIRCUIT INCLUDING A RELIEF VALVE DEVICE

The present invention relates to an open hydraulic circuit including a main pump suitable for delivering a fluid under pressure, a hydraulic motor, two main ducts for the feed and for the discharge of said motor, a selector suitable for connecting the main ducts respectively to the main pump and to an unpressurized reservoir for operating the motor, and of isolating said ducts from said pump and from said reservoir for braking the motor, means for connecting a boost duct to the discharge main duct, and two pressure limiters disposed between said main ducts and for limiting the pressure in a respective one of said ducts by diverting excess fluid from said duct into the other duct.

BACKGROUND OF THE INVENTION

The unpressurized reservoir is at atmospheric pressure or at a low pressure, no greater than the boost pressure.

By means of its hydraulic motor, such a circuit serves, for example, to drive a mass, such as the turret of a vehicle, e.g. a hydraulic digger, or such as a tired vehicle whose wheels are driven by hydraulic motors.

It is an open circuit, and in operation, the feed main duct is connected to the delivery orifice of the pump, while the discharge main duct is connected to the unpressurized reservoir. In a manner known per se, the selector can make it possible to invert the connections so as to cause the motor to operate in both operating directions.

For example, the hydraulic motor is of the type having radial pistons.

In order to brake or stop the motor, the selector is placed in the isolation position so as to isolate the main ducts from the pump and from the reservoir. In other words, the feed and the discharge of the motor are both interrupted.

In general, it is desired to limit leaks in hydraulic circuits, and so modern hydraulic components, in particular those of the motor, are increasingly fluid-tight. This makes it possible, in particular, to brake with precision and to prevent the mass driven by the motor tending to start moving again after it has been stopped, e.g. under the effect of its inertia, in particular when said mass is on a slope.

In addition, the boost duct is connected to a discharge main duct in order to avoid cavitation phenomena in said duct. This connection is achieved by disposing a check valve on the boost duct, which check valve allows fluid to flow only in the direction going from the boost pump towards the discharge main duct.

That arrangement thus makes it possible to boost the discharge main duct with boost fluid.

The main duct which, when the circuit is in an operating state, is at low pressure, can also receive fluid from the duct at the high pressure, when said high pressure is deemed to be excessive. That transfer of fluid is made possible by means of the presence of the pressure limiters for protecting the circuit against excessive pressure, which pressure limiters are disposed between the main ducts. That transfer of fluid achieves additional boosting which does not go through the check valves used for the boosting from the boost duct, so that said check valves can have small dimensions.

In general, the pressure limiters are disposed in the vicinities of the main orifices of the motor. When the main ducts are isolated from the pump and from the reservoir for braking the motor, the motor and the two above-mentioned pressure limiters form a closed loop containing a relatively small volume of fluid, which volume is only slightly larger than the active cubic capacity of the motor.

It has been observed that, when the motor is stopped by isolating the main ducts from the pump and from the reservoir, an increase in the volume of fluid present in said closed loop can occur. That increase in volume is due at least in part to an increase in the temperature of the fluid present in said loop, the energy necessary for the braking dissipating therein in the form of heat. In addition, it can happen that, in its isolation position, the selector does not isolate the main ducts and the pump in completely fluid-tight manner, so that a small quantity of fluid coming from the pump continues to feed the above-mentioned closed loop.

Said increase in volume, which can occur during braking, gives rise to an increase in the fluid pressure in the above-mentioned closed loop, which generates load on the components of the motor, in particular on the bearings via which the rotor and the stator rotate relative to each other. Ultimately, that phenomenon can lead to premature wear on certain components of the motor, in particular its bearings.

OBJECTS AND SUMMARY OF THE INVENTION

An object of the present invention is to remedy the above-mentioned drawbacks, or at least to limit their effects, by making it possible, when the main ducts are isolated from the pump and from the reservoir for braking the motor, to avoid or at least to limit the increase in pressure in the above-mentioned closed loop.

This object is achieved by means of the fact that the circuit of the invention includes a relief valve device suitable for taking up a retention position and a relief position in which said device puts one of said main ducts into communication with a relief enclosure, the relief valve device being continuously urged back into one of its positions by resilient return means and being caused to go into its other position by a control duct connected to one of the main ducts, so that the device is suitable for taking up its relief position when, after the selector has isolated the main ducts from the main pump and from the reservoir, the difference between the pressure in the main duct to which said control duct is connected and a relief pressure higher than the boost pressure changes sign.

In the invention, it is thus by removing the excess volume of fluid from the closed loop that the pressure increase in said loop is limited.

The relief pressure is predetermined and depends, in particular, on the rating of the resilient return means of the relief valve device. The fact that the difference between the pressure in the main duct to which the control duct is connected and said predetermined relief pressure changes sign is an indication of the risk of a pressure increase, related to a volume increase, in the motor and in the main ducts that are isolated from the pump and from the reservoir by the selector.

It is when such a situation is detected that the relief valve goes into its relief position, thereby making it possible to remove the excess volume of fluid to the relief enclosure.

The boost duct is fed by boost means which can be a boost pump, a valve tapping the fluid delivered by the main pump, or else an auxiliary pump, delivering a fluid for performing an auxiliary function.

The relief enclosure advantageously comprises one of the enclosures formed by the internal space of the casing of the motor, the internal space of the casing of the boost pump (if such a pump is present), and an unpressurized reservoir. It is particularly advantageous for the relief enclosure to be formed by the boost duct. In all cases, the enclosure is a low-pressure enclosure. When said enclosure is an internal space of the casing of the motor, the relief valve device can be disposed in the immediate vicinity of the casing, or even be mounted thereon so as to form a compact unit with it.

In an advantageous embodiment, the relief valve device comprises at least one relief valve comprising a pressure limiter having an inlet suitable for being put into communication with the main duct that is at the higher pressure, and an outlet connected to said relief enclosure, the inlet of said limiter communicating with its outlet so as to connect said main duct to the relief enclosure when the pressure in said main duct is at least equal to the relief pressure.

In this embodiment, the relief is provided by tapping fluid from the main duct that is at the higher pressure, whenever said higher pressure reaches the relief pressure.

The relief is thus provided during braking by generating a leak from the duct at the higher pressure.

The leak can also exist when the motor is operating because, in at least certain operating situations, the pressure in the main duct that is at the higher pressure is higher than the relief pressure. Said leak can be limited by disposing a constriction upstream or downstream from the relief valve, which constriction generates considerable head loss. In other words, in this case, the relief valve allows only a small amount of fluid to be removed.

In this embodiment, the relief pressure is advantageously high, while remaining of the same order as the opening pressures of the pressure limiters that are disposed between the two main ducts. The relief pressure can be slightly higher than said opening pressures, but it is advantageously slightly lower than them, so that the relief valve is opened even before one of the pressure limiters opens. As explained below, this makes it possible to limit vibration in the motor during braking.

In another advantageous embodiment, the relief valve device comprises at least one relief valve having an inlet and a control duct that are connected to one of the main ducts and an outlet that is connected to the relief enclosure, which valve is suitable for taking up a retention position in which said inlet and outlet are isolated from each other, and a relief position in which said inlet and outlet communicate so as to allow the fluid to flow from the main duct to which the control duct is connected to the relief enclosure, said relief valve being caused to go into its retention position when the pressure in the main duct to which the control duct is connected is at least equal to the relief pressure, while it is suitable for taking up its relief position when the pressure in said control duct is lower than the relief pressure.

During braking, the motor operates momentarily as a pump, so that the main duct that served as a discharge before the braking is at the high pressure relative to the main duct which, before the braking, served as the feed and in which a considerable reduction in pressure occurs.

In this embodiment, the relief is provided by tapping fluid from the main duct that is at the low pressure, and it is triggered by the fact that the pressure in said duct becomes lower than the relief pressure. The excess fluid in the other main duct is transferred into the main duct that is at the low pressure by one of the pressure limiters that are disposed between the two ducts. Thus, by tapping fluid from the main duct that is at the low pressure, it is possible to reduce the pressure in the other main duct.

In yet another advantageous embodiment, the relief valve device comprises at least one relief valve having an inlet connected to one of the main ducts, a control duct connected to the other main duct and an outlet connected to the relief enclosure, said valve being suitable, at rest, for taking up its retention position in which said inlet and outlet are isolated from each other, and being suitable, when the pressure in the main duct to which the control duct is connected is at least equal to the relief pressure, for taking up its relief position in which said inlet and outlet communicate with each other in the direction in which the fluid flows from the inlet towards the outlet.

In this embodiment, it is when the pressure in the main duct which, at a given time, is at the high pressure, becomes higher than the relief pressure that the relief valve opens to enable fluid to be tapped from the other main duct.

Advantageously, the circuit includes at least one constriction disposed downstream or upstream from the relief valve(s).

The presence of such a constriction makes it possible, in particular, to generate head loss between the relief enclosure and the main duct from which fluid is tapped by the relief valve device when said valve device is in the relief position.

BRIEF DESCRIPTION OF THE DRAWINGS

The invention will be well understood and its advantages will appear more clearly on reading the following detailed description of embodiments shown by way of non-limiting example. The description refers to the accompanying drawings, in which.

MORE DETAILED DESCRIPTION

Figure 1:
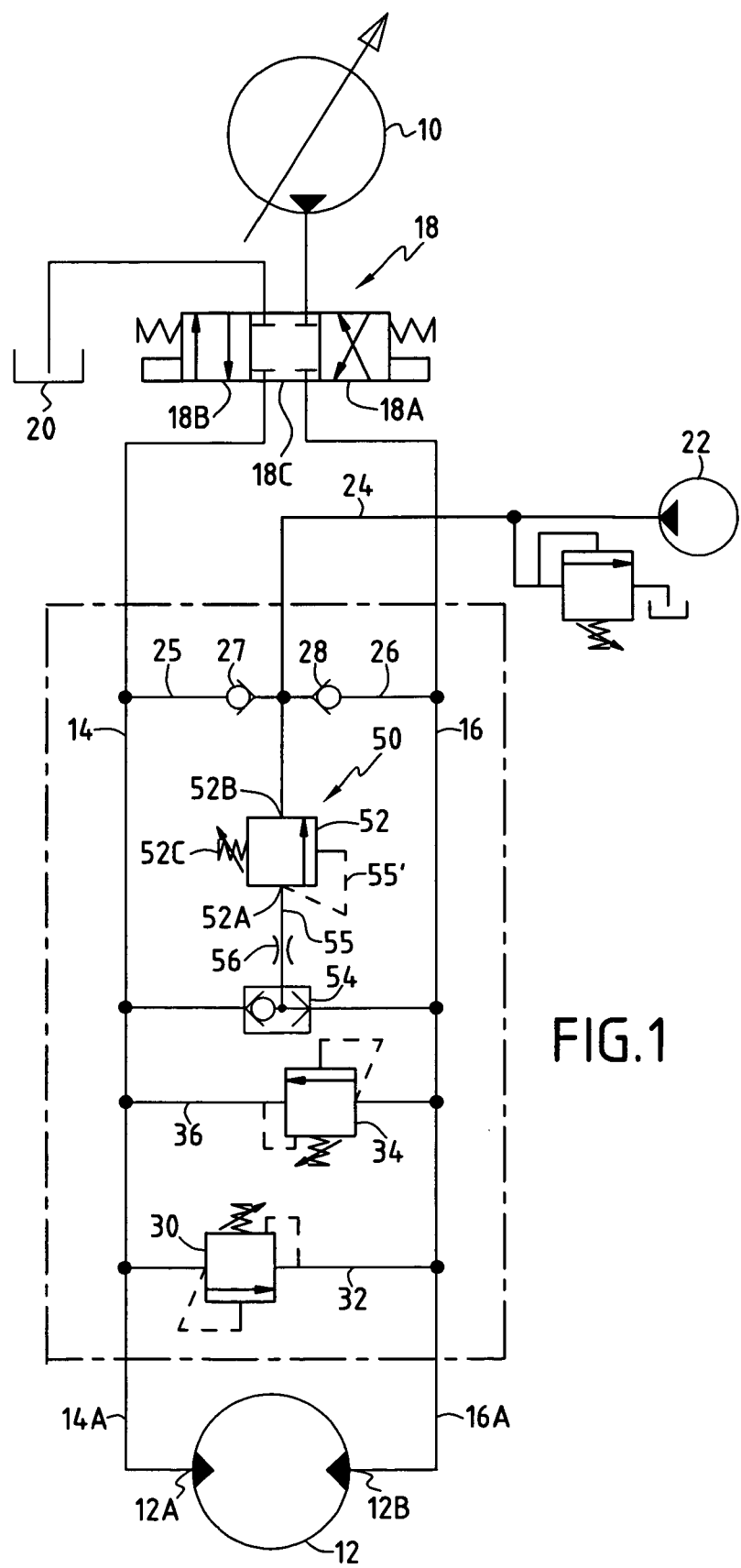
FIGS. 1 and 2 show two variants of the circuit of the invention, in a first embodiment.

The circuit of FIG. 1 includes a main pump 10, e.g. a pump having a variable cubic capacity, serving to feed a hydraulic motor 12. To this end, the circuit includes two main ducts 14 and 16 which serve respectively as the feed and as the discharge of the motor. Via a selector 18, the feed main duct can be connected to the outlet orifice of the pump 10, whereas the discharge main duct is connected to a reservoir 20 without extra pressure. In this example, in a manner known per se, the selector 18 has three positions, namely a first operating position 18A in which it connects the ducts 14 and 16 respectively to the pump 10 and to the reservoir, a second active operating position 18B in which the connections between the ducts and the pump and the reservoir are inverted, and an isolation position 18C in which it ceases to connect the ducts 14 and 16 to the pump 10 and to the reservoir 20.

The circuit also includes a boost pump 22 which is suitable for sustaining boost pressure in a boost duct 24 connected to its outlet. The boost duct is connected to the main ducts 14 and 16 via boost segments 25 and 26 on which check valves, respectively 27 and 28, are disposed, allowing the fluid to flow only from the boost pump to the main duct to which the boost segment in question is connected. When the motor is operating, this makes it possible, in particular, to avoid cavitation in the discharge main duct by boosting that duct from the boost pump.

The circuit also includes two pressure limiters which are disposed on communication segments via which the main ducts communicate. One of the pressure limiters 30 is disposed on the communication segment 32 allowing communication from the duct 14 to the duct 16, and, when the pressure upstream from it, i.e. in the duct 14, reaches a predetermined pressure threshold, said pressure limiter opens to divert excess fluid from the duct 14 into the duct 16. Symmetrically, the pressure limiter 34 is disposed on the communication segment 36 allowing communication from the duct 16 to the duct 14 so as to open when the pressure upstream from it, i.e. in the duct 16, reaches a predetermined threshold so as to divert excess fluid from the duct 16 into the duct 14.

In other words, when the pressure inside one of the main ducts reaches the predetermined threshold due to the presence of excess fluid in that duct, the pressure limiters 30 and 34 make it possible to boost the other main duct by diverting the excess fluid into said other main duct.

The circuit of FIG. 1 also includes a relief valve 50 which comprises a pressure limiter 52 whose inlet 52A is suitable for being put into communication with the main duct 14 or 16 at the higher pressure, and whose outlet is connected to a relief enclosure.

In this example, the circuit of FIG. 1 includes a circuit selector 54 via which a link duct 55 connected to the inlet 52A of the pressure limiter 52 is connected to the main ducts 14 and 16, which selector puts the inlet 52A of the pressure limiter 52 and its control duct 55' into communication with that one of the two ducts which is at the higher pressure. For example, the circuit selector is formed by a slide valve.

A constriction 56 is disposed upstream from the pressure limiter 52 between the inlet thereof and the circuit selector 54.

In the example of FIG. 1, the relief enclosure to which the outlet 52B of the pressure limiter 52 is connected is formed by the boost duct 24. It can be constituted by some other enclosure, e.g. by the internal space of the casing of the motor, by the internal space of the casing of the pump, or indeed by the unpressurized reservoir. It is a low-pressure enclosure when considered relative to the pressure delivered by the main pump. Naturally, the pressure of the enclosure (which pressure is the boost pressure in this example) is lower than relief pressure which is the pressure threshold as from which the pressure limiter 52 opens in order to interconnect its inlet and its outlet so as to enable fluid contained in the main duct at the higher pressure to be relieved towards the relief enclosure.

The pressure limiter 52 is normally urged back into its retention position by its return spring 52C. It opens whenever the pressure in one of the main ducts becomes higher than the relief pressure, thereby organizing leakage from said main duct to the relief enclosure.

The constriction 56, which can be situated downstream from or upstream from the pressure limiter 52 limits said leakage.

A description follows of how the relief valve 50 operates during braking by considering, for example, that, before said braking, the selector 18 was in its position 18A, so that the main duct 14 was at the higher pressure and served as the feed, while the main duct 16 was at the low pressure and served as the discharge by being connected to the reservoir 20. During braking, the selector 18 goes into its isolation position 18C, thereby isolating the ducts 14 and 16 from the pump and from the reservoir. Whereupon, the mass which was driven by the motor tends to continue to move under its inertia, i.e., for a short time, it is the mass that drives the motor which then operates as a pump.

As a result, the pressures in the ducts 14 and 16 are inverted, the pressure in the duct 14 then becoming lower than the pressure in the duct 16.

Insofar as the selector 18 is in its isolation position 18C, the communication segment 36 co-operates with the segments 14A and 16A of the ducts 14 and 16 that are situated between said segment 36 and the main orifices of the motor 12A and 12B to form a closed loop of small volume.

As indicated above, the volume of fluid present in said loop can increase, in particular due to the fluid heating up. This results in excess pressure which is not removed from the closed loop via the pressure limiter 34. However, this excess pressure can be removed via the pressure limiter 52 which taps the excess volume of fluid from the duct 16 when the pressure in said duct reaches the relief pressure.

The relief pressure, which is the rated pressure of the limiter 52 is preferably relatively high while also being of the same order of magnitude as the rated pressures of the above-mentioned pressure limiters 30 and 34, i.e. at the pressure thresholds enabling those limiters to be opened, or even slightly lower than said rated pressures.

It is advantageous for the pressure limiter 52 to open before one of the limiters 30 or 34 (the one whose inlet is connected to the main duct that is at the higher pressure) opens. During braking, the pistons of the hydraulic motor can generate pulsating pressure in the main ducts. Such pulsations result in momentary excess pressure in one of the main ducts, which excess pressure causes the pressure limiter 30 or 34 whose inlet is connected to said main duct to open so as to divert the excess fluid into the other main duct. In other words, the volumes of fluid transferred due to the pressure pulsations are exchanged between the two main ducts via the pressure limiters 30 and 34 because, during braking, the main ducts are in a closed loop since the selector 18 is in its isolation position 18C.

As a result, the pressure pulsations are not attenuated and they cause the motor to vibrate. Operation of the motor can then become noisy.

By appropriately choosing a relief pressure that is lower than the pressure thresholds of the pressure limiters 30 and 34, it is possible, when pressure pulsations occur under the above-mentioned conditions during braking, for the pressure limiter 52 to open before one of the limiters 30 and 34, thereby enabling momentary excess of fluid in one main duct to be transferred to the relief enclosure. The fluid thus does not remain in the above-mentioned closed loop, and the cause of the vibration in the motor disappears very rapidly.

Figure 2:
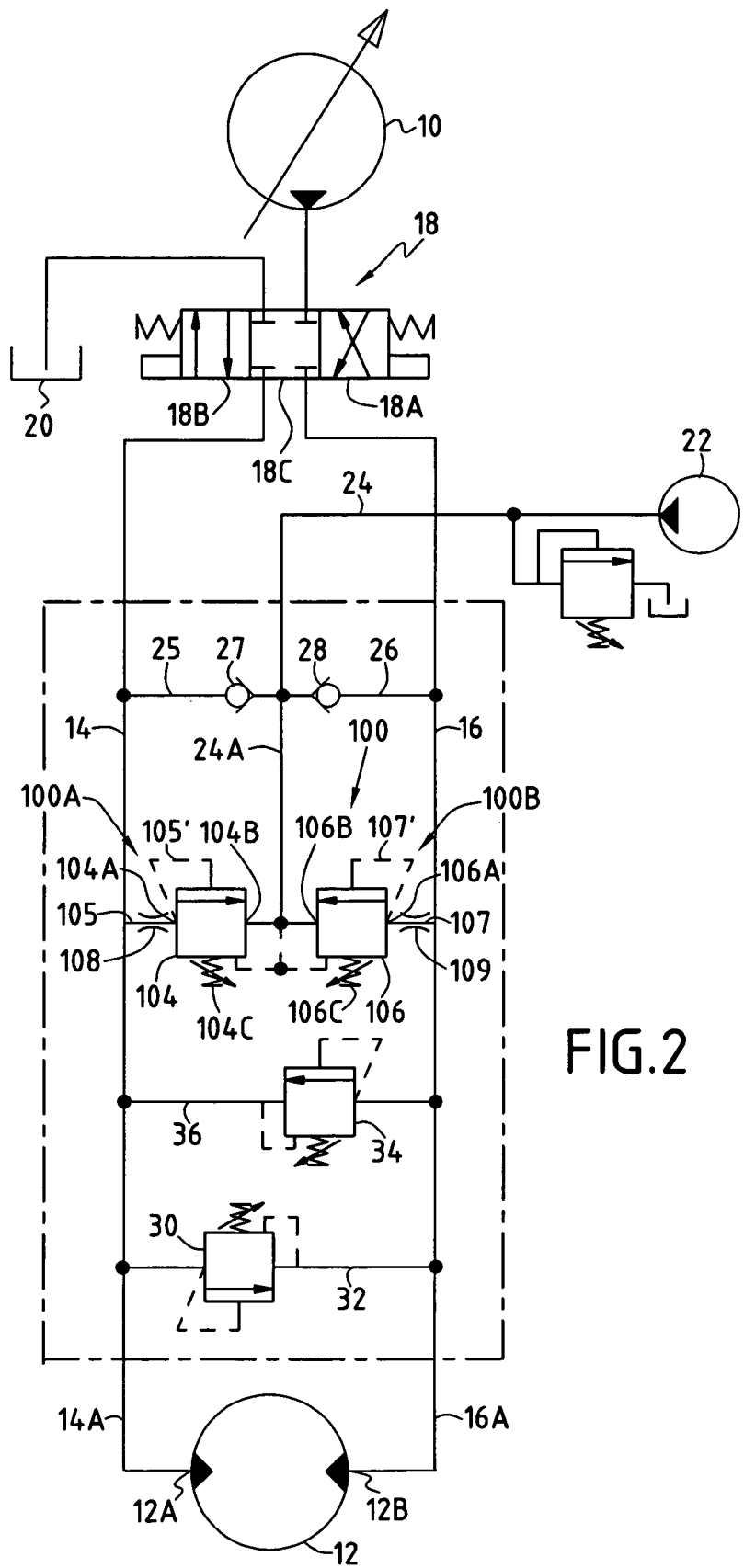

The circuit in FIG. 2 uses the same principle as the principle shown in FIG. 1, by using a relief valve 100 which, like the valve 50 of FIG. 1, taps the excess volume of fluid in the closed circuit during braking from the main duct at the higher pressure.

In FIGS. 2 to 6, the elements that are unchanged relative to FIG. 1 are designated by the same references.

The relief valve device 100 of FIG. 2 comprises two relief valves, respectively 100A and 100B, each of which comprises a pressure limiter, respectively a pressure limiter 104 whose inlet 104A is connected to the main duct 14 via a link duct 105, and a pressure limiter 106 whose inlet 106A is connected to the main duct 16 via a link duct 107.

It can also be seen that constrictions 108 and 109 are disposed on respective ones of the ducts 105 and 107, i.e. upstream from the pressure limiters 104 and 106. However, since the outlets 104B and 106B of the limiters are connected to the boost duct 24 that acts as the relief enclosure, it is possible to make provision for the constrictions 108 and 109 to be replaced by one constriction disposed on the segment 24A of said duct 24 that extends between the outlets of the limiters and the link node via which said duct is connected to the boost segments 25 and 26.

Via their control ducts 105' and 107' connected to respective ones of the link ducts 105 and 107, the inlets 104A and 106A of the limiters 104 and 106 are connected to respective ones of the main ducts 14 and 16.

The return springs 104C and 106C which urge the pressure limiters 104 and 106 back into their closed positions (retention position of the relief valve device) are rated so as to allow the limiters to open only when the pressure in the main ducts to which their inlets 104A and 106A are respectively connected reaches the relief pressure.

If it is considered that the selector 18 is initially in its position 18A, the main duct 14 then being the feed main duct, then, during braking, as indicated above with reference to FIG. 1, the pressures in the ducts 14 and 16 are inverted, the pressure in the duct 16 being higher than the pressure in the duct 14. When, due to the presence of excess fluid, the pressure in the duct 16 reaches the relief pressure, the pressure limiter 106 opens to enable the excess pressure to be relieved.

As in the embodiment of FIG. 1, and for the same reasons, the value of the relief pressure is advantageously chosen to be close to the rated value of the pressure limiters 30 and 34.

Figures 3, 3A:
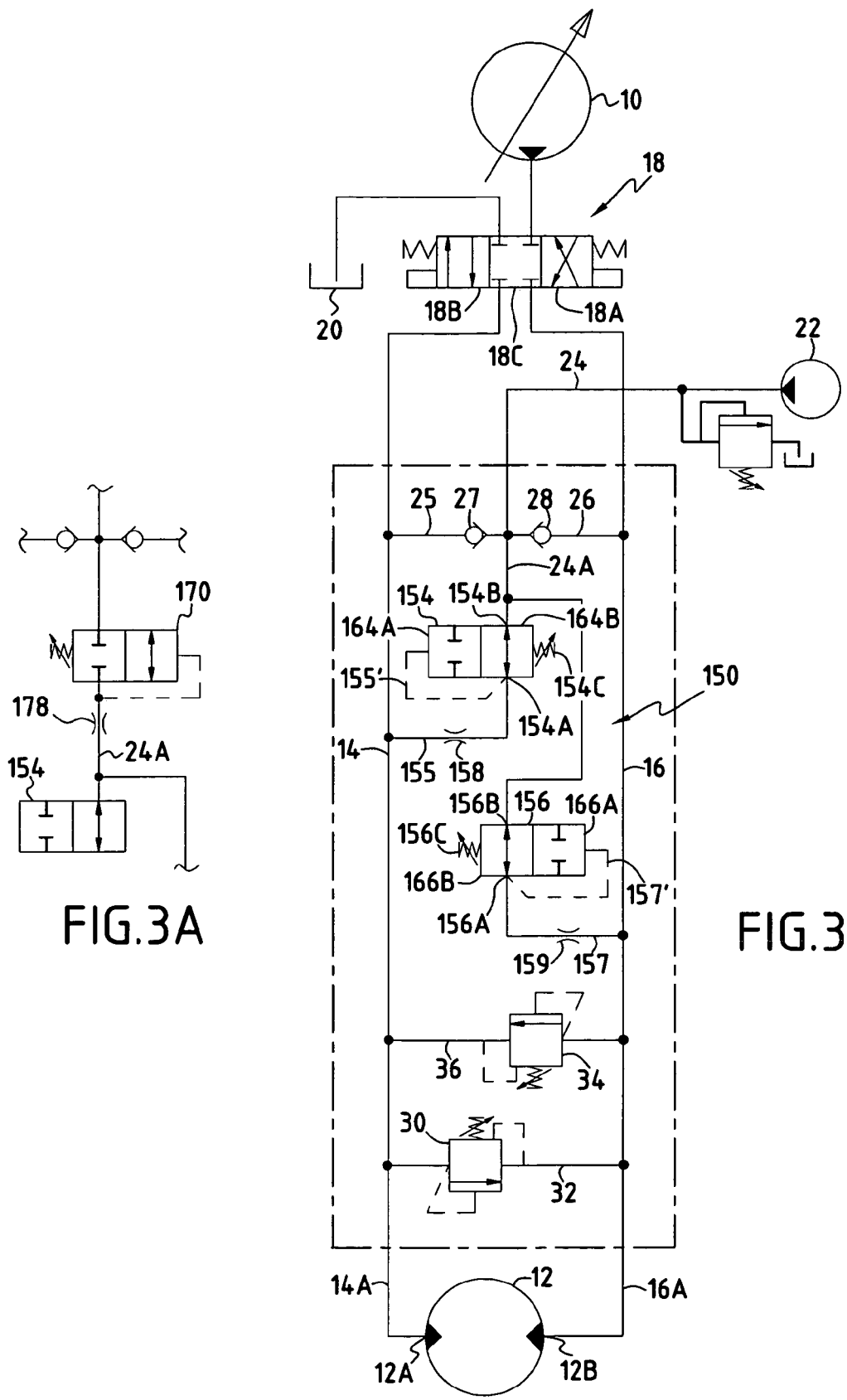
FIGS. 3, 3A, and 4 show variants of said circuit, in another embodiment.

A description follows of FIG. 3 which shows a second embodiment.

The circuit of FIG. 3 differs from the circuits of FIGS. 1 and 2 by its relief valve device 150. This device comprises two relief valves, respectively 154 and 156. The valve 154 has an inlet 154A which is connected to the main duct 14 via a link segment 155 and a control duct 155' connected to said link segment and thus also to the duct 14. The outlet 154B of said valve is connected to the relief enclosure which, in this example, is constituted by the boost duct 24.

The relief valve 156 has an inlet 156A which is connected to the main duct 16 via a link segment 157 and a control duct 157' connected to said segment 157 and thus to the duct 16, and an outlet 156B which is also connected to the relief enclosure constituted by the boost duct 24.

Each of the relief valves 154 and 156 is suitable for taking up a retention position, respectively 164A for valve 154 and 166A for valve 156, in which its inlet and outlet are isolated from each other, at least in the direction of flow of the fluid going from the inlet towards the outlet or, as in the example, in both directions.

Each of the valves 154 and 156 is also suitable for taking up a relief position, respectively 164B and 166B, in which its inlet and outlet communicate with each other so as to enable fluid to flow from the main duct, respectively 14 and 16, to which the control duct, respectively 155' and 157', is connected, towards the relief enclosure 24. In this example, it can be seen that the relief valves are naturally urged back into their relief positions by their return springs, respectively 154C and 156C. It is when the pressure in their respective control ducts 155' and 157' reaches the relief pressure that the valves are caused to go over to their respective retention positions.

A description follows of the behavior of the circuit during braking. It is considered that the selector 18 is initially in its position 18A, so that the ducts 14 and 15 are respectively at the high pressure and at the low pressure. The high pressure in the duct 14 places the relief valve 154 in its retention position 164A. Conversely, the pressure in the discharge duct 16 is substantially equal to the boost pressure, which is itself lower than the relief pressure corresponding to the rating of the spring 156C (while taking account of the constriction 159 disposed on the duct 157), so that the valve 156 is in its natural relief position.

In this example, insofar as the relief enclosure is merely the boost duct, this naturally does not result in the pressure in the duct 16 becoming lower than the boost pressure. Even if the relief enclosure were at a pressure lower than the boost pressure (which applies if said enclosure is, for example, the casing of the motor or the casing of the pump), the pressure in the duct 16 would be affected to a small extent only, firstly because of the presence of the constriction 159 on the duct 157 that causes considerable head loss between the duct 16 and the relief enclosure, and secondly by means of the normal operation of the boost pump that increases the pressure in the duct 16.

It should be noted that the constrictions, respectively 158 and 159, are disposed on respective ones of the ducts 155 and 157, i.e. upstream from the respective relief valves 104 and 106 in the direction in which the fluid flows from the main ducts towards the relief enclosure. In a variant, said constrictions could be placed immediately downstream from the valves 154 and 156, or else replaced with a single constriction disposed on the segment 24A of the boost duct, which is a common segment between the outlets of the relief valves and the connection at which the boost valves 27 and 28 are connected to the boost duct.

Starting from the above-described situation, braking is performed by placing the selector 18 in its isolation position 18C. The ducts 14 and 16 are thus isolated from the pump and, for the above-mentioned reasons, relating to the inertia of the mass driven by the motor, the pressures in the ducts are inverted. When the volume of fluid in the circuit which is isolated from the main pump and from the reservoir increases, the pressure in the duct 16 can increase until it exceeds the relief pressure, thereby causing the relief valve 156 to go over to its retention position 166A. At the same time, insofar as the motor operates as a pump, the pressure in the duct 14 can decrease to lower than the relief pressure, in which case the relief valve 154 goes into its relief position 164B. Under these conditions, an excess volume of fluid in the ducts 14 and 16 can be tapped from the duct 14 so as to be brought into the relief enclosure 24.

Advantageously, the value of the relief pressure is slightly higher, e.g. of the order of at least 5 bars higher, than the boost pressure.

As can be seen in the fragmentary view of FIG. 3A, an additional valve 170 having two positions, which can be a selector valve or a shut-off valve, can be disposed on the segment 24A of the duct 24. The valve 170 is caused to go into the open position by the upstream pressure and to go into the closed position by a return spring rated at a pressure slightly lower than the relief pressure and higher than the boost pressure. The constrictions 158 and 159 are replaced with a single constriction 178 disposed on the common segment 24A downstream (in the direction in which the fluid flows from the duct 14 or 16 to the duct 24) from the outlets of the two relief valves 154 and 156 and upstream from the valve 170 in order to limit the leakage and in order to make it possible for pressure to be built up in the circuit; the valve 170 prevents continuous leakage from being generated at rest.

Figure 4:
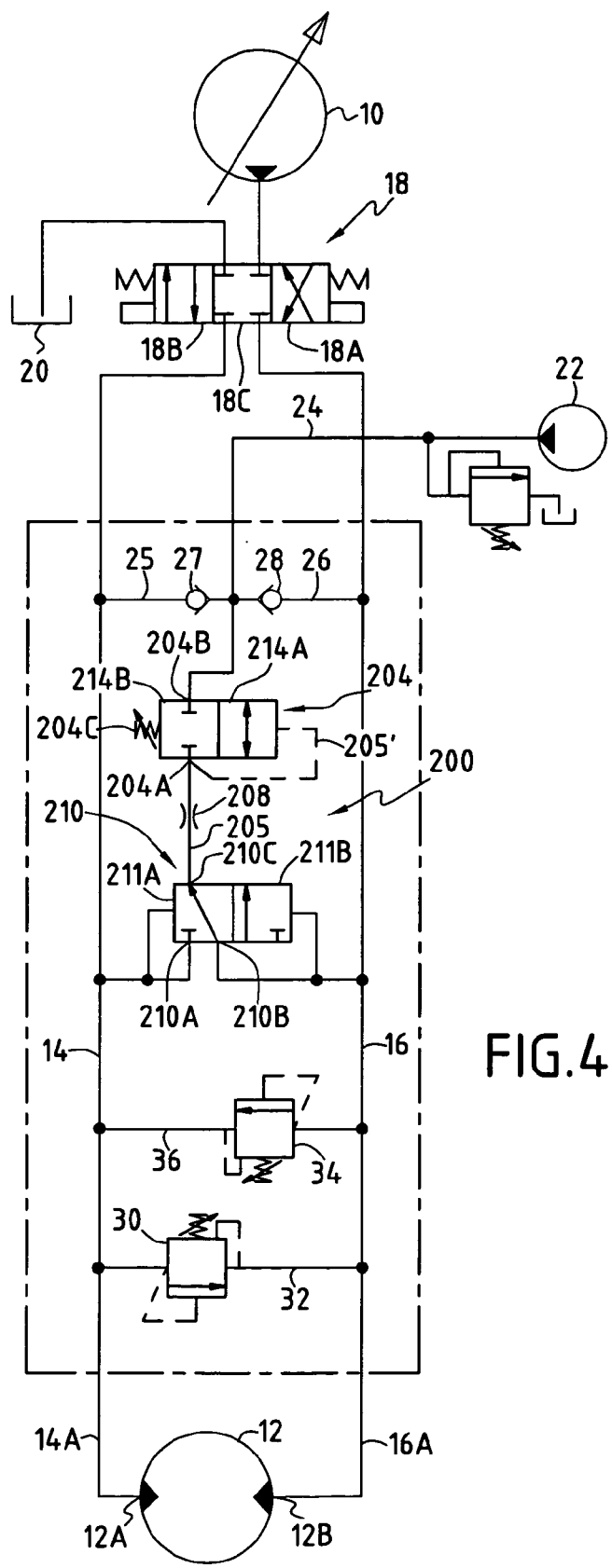

A description follows of FIG. 4 which shows a variant of the embodiment of FIG. 3. In this variant, the relief valve 200 comprises a relief valve 204 which is connected to the main ducts 14 and 16 via a connection selector 210. More precisely, the inlet 204A of the relief valve is connected to the outlet 210C of the connection selector via a link duct 205, while the outlet 204B of the valve 204 is connected to the relief enclosure constituted by the boost duct. Under the effect of its return spring 204C, the valve 204 is naturally urged back into its retention position 214B so as to prevent fluid from flowing from its inlet to its outlet. Conversely, when the pressure in the control duct 205' becomes higher than the rated pressure of the spring 204C, the valve 204 is placed in its relief position 214A in which its inlet and its outlet communicate with each other.

The two inlet ports, respectively 210A and 210B, of the connection selector 210 are respectively connected to the main ducts 14 and 16 and said selector is controlled hydraulically so as to connect its outlet 210C to that one of the ducts 14 and 16 which is at the lower pressure.

The circuit behaves as follows. If it is considered that, in operation, the duct 14 is the feed main duct, then the selector 210 is situated in its position 211A and it connects the discharge duct 16 to the inlet of the relief valve 204. Since the pressure in the duct 16 is normally substantially equal to the boost pressure and is thus lower than the rated pressure of the spring 204C, the relief valve is situated in its retention position 214B and it isolates the duct 16 from the boost duct 24.

During braking, the selector goes into its position 18C and isolates the ducts 14 and 16 from the pump and from the reservoir. For the above-mentioned reasons, the pressures in said ducts are inverted, so that the pressure in the duct 16 that is connected to the delivery orifice of the motor becomes higher than the pressure in the duct 14. The selector 210 is then moved into its position 211B and it then connects the duct 14 to the inlet 204A of the valve 204. The pressure in said duct 14 decreases but, so long as it remains higher than the relief pressure, it cause the valve 204 to go into its relief position 214A, thereby enabling the excess volume of fluid to be relieved from the duct 14. In the same way as for the device of FIG. 3, the value of the relief pressure is advantageously slightly higher, e.g. of the order of at least 5 bars higher, than the boost pressure. As a result, the valve 204 remains in its position 214B and it enables pressure to be relieved from the duct 14.

Figure 5:
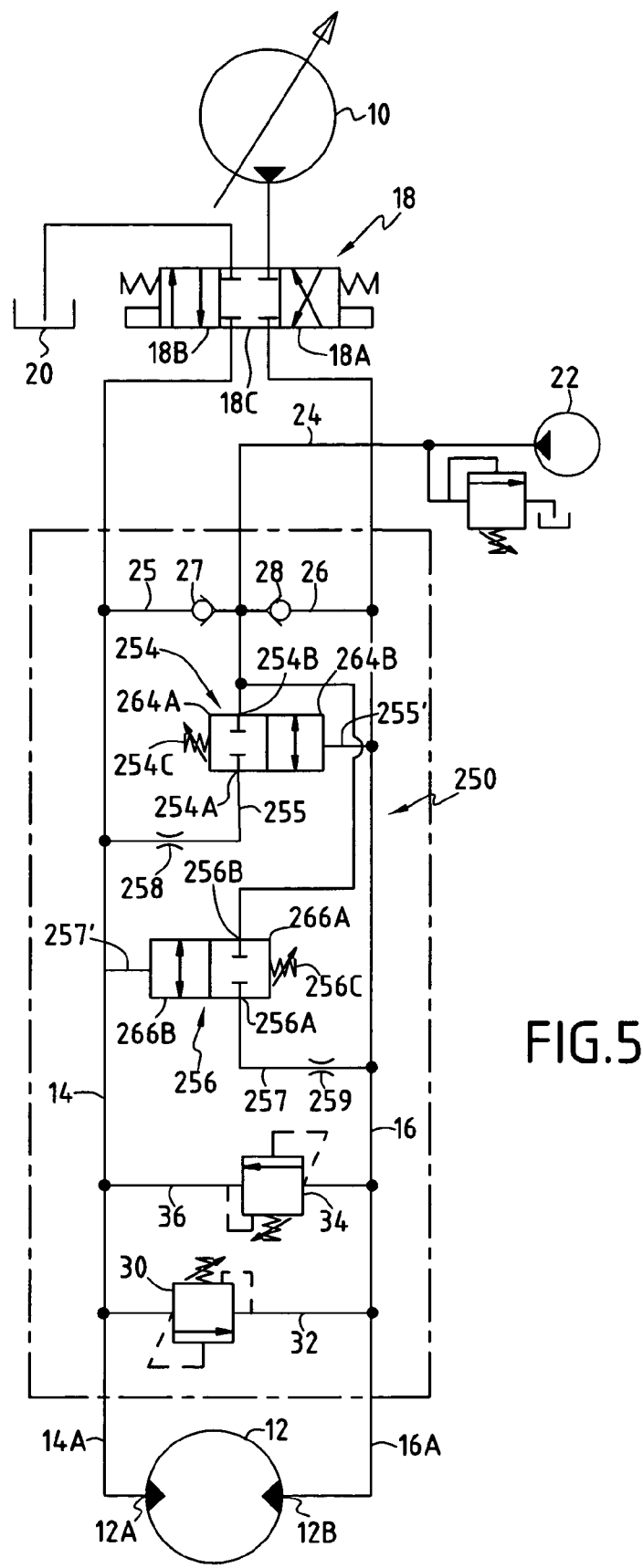
FIGS. 5 and 6 show two other variants in yet another embodiment.
Figure 6:
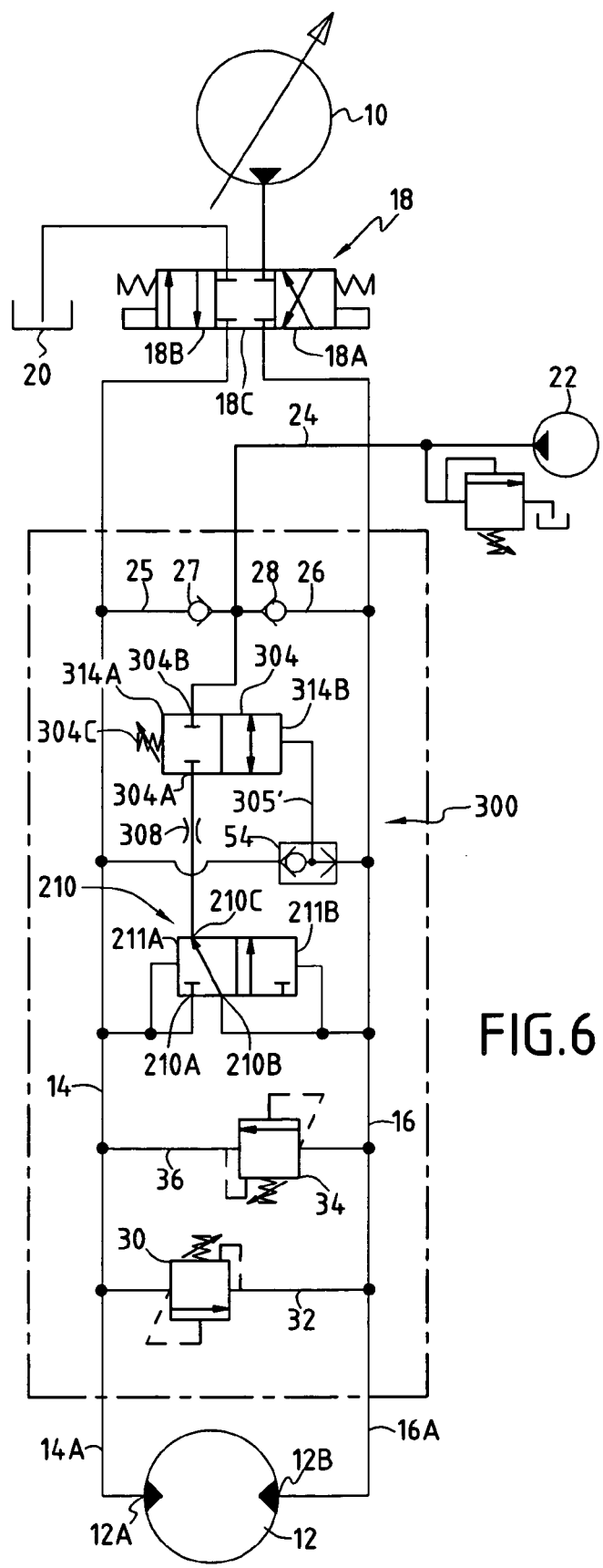

A description follows of FIGS. 5 and 6 which show another embodiment, in two variants. In FIG. 5, the relief device 250 comprises two relief valves, respectively 254 and 256. The respective inlets 254A and 256A of said valves are connected to respective ones of the main ducts 14 and 16, by respective link ducts 255 and 257. Conversely, the control duct 255' of the valve 254 is connected to the duct 16 and the control duct 257' of the valve 256 is connected to the duct 14.

The respective outlets 254B and 256B of the valves 254 and 256 are connected to the relief enclosure constituted in this example by the boost duct 24.

At rest, the valves 254 and 256 are urged back naturally by their respective springs 254C and 256C into their respective retention positions 264A and 266A in which their respective inlets and outlets are isolated from each other, at least in the direction in which fluid flows from the inlet to the outlet or, as in this example, in both directions. When the pressure in the main duct 16 to which the control duct 255' of the valve 254 is connected reaches the relief pressure, said valve is moved into its relief position 264B, in which its inlet and its outlet communicate with each other. Similarly, when the pressure in the duct 14 to which the control duct 257' of the valve 256 is connected reaches the relief pressure, said valve 256 is moved into its relief position 266B in which its inlet and its outlet communicate with each other.

Constrictions, respectively 258 and 259 are disposed on the link ducts 255 and 257, i.e. upstream from the valves 254 and 256 in the direction in which the fluid flows from the main ducts to the relief enclosure.

They could be replaced with constrictions disposed downstream from said valves or with a constriction disposed on the common connection duct connecting their respective outlets to the relief enclosure.

In operation, if it is considered that the main duct 14 is at the high pressure, the valve 254 is situated in its retention position 264A, while the valve 256 is situated in its relief position 266B or in its retention position 266A depending on whether the high pressure in the duct 14 is higher than or lower than the rated pressure of the spring 256C, which pressure corresponds to the relief pressure. A quantity of fluid, limited by the constriction 259 and by the fact that, in this example, the relief enclosure is the boost duct, is thus possibly tapped from the duct 16.

During braking, the pressures in the ducts 14 and 16 are inverted. If it was not already lower than the relief pressure, the pressure in the duct 14 becomes lower than said relief pressure, and so the valve 256 returns to its retention position 256A. The pressure in the duct 16 increases and becomes higher than the relief pressure, and the valve 254 reaches its relief position 264B, thereby making it possible to provide relief by tapping fluid from the duct 14 which, at that time, is at the low pressure.

In the variant shown in FIG. 6, the relief valve device 300 comprises a relief valve 304 whose inlet 304A is connected to the main ducts 14 and 16 via a connection selector 210 analogous to the connection selector of FIG. 4.

The control duct 305' of the valve 304 is connected to the main ducts 14 and 16 via a circuit selector 54 analogous to the connection selector of FIG. 1.

In operation, if it is considered that the duct 14 is the feed main duct, the selector 210 is situated in its position 211A and it connects the discharge duct 16 to the inlet 304A of the valve 304, via the constriction 308 which is disposed upstream from said valve, between the selector 210 and the inlet 304A. At the same time, the circuit selector 54 connects the main duct 14 that is at the high pressure to the control duct 305' of the valve 304. Depending on whether the pressure in the duct 14 is, in operation, higher than or lower than the relief pressure that corresponds to the rating of the spring 304C of the valve 304, said valve is then placed in its relief position 314B or in its retention position 314A, respectively. Thus, the discharge main duct 16 which is at the low pressure can be connected to the relief enclosure.

During braking, performed by the selector 18 going into its position 18C, the pressures in the ducts 14 and 16 are inverted. The selector 210 thus reaches its position 211B and then, in this example, connects the duct 14 to the inlet 304A of the valve 304 since the pressure in the duct 14 becomes lower than the pressure in the duct 16. However, via the circuit selector 54, it is this duct 16 that is connected to the control duct 305' of the valve 304. Therefore, so long as the pressure in the duct 16 is lower than the relief pressure to which the spring 304C is rated, the valve 304 takes up its retention position 314A. When, conversely, the pressure in the duct 16 reaches the relief pressure, the valve 304 goes into its relief position 314B, thus making it possible to relieve the circuit which is held closed by the selector 18C by tapping fluid from the duct 14 that is then at the low pressure.

In the embodiment shown in FIGS. 5 and 6, the value of the relief pressure can be chosen to be close to the rated value of the pressure limiters 30 and 34 as it is for the limiters 52, and 104 & 106, respectively of the variants of FIGS. 1 and 2. Advantageously, the value of the relief pressure can be an average pressure which is intermediate between the value of the boost pressure and the value of the rated pressure of the pressure limiters 30 and 34, this intermediate value being determined depending on the operating conditions of the circuit.

In the embodiment of FIGS. 1 and 2, the excess fluid is relieved by being tapped from the main duct which, during braking, is at the high pressure and the relief valve 50 or 100 is caused to go into its relief position by the pressure in the same duct.

In the embodiment of the FIGS. 3 and 4, the relief is provided by tapping fluid from the main duct which, during braking, is situated at the low pressure, and the relief valve device 150 or 200 is caused to go into its relief position by the same duct because this is possible when the pressure in said duct becomes lower than the relief pressure.

In the embodiment shown in FIGS. 5 and 6, the relief is provided by tapping fluid from the main duct which, during braking, is situated at the low pressure, and the relief valve 250 or 300 is caused to go into its relief position by the fluid pressure in the other main duct.

In any event, for providing relief, the excess fluid volume is tapped from the closed loop, regardless of the main duct from which it is tapped. By tapping the main duct at low pressure, it is possible to use components dimensioned for low pressures.

The relief valve(s) can be incorporated in a set which includes, inter alia, the pressure limiters and the boost valves. Preferably, the relief valve(s), or even the above-mentioned set, can be incorporated into the hydraulic motor.

What is claimed is:

1. An open hydraulic circuit including a main pump suitable for delivering a fluid under pressure, a hydraulic motor, two main ducts for the feed and for the discharge of said motor, a selector suitable for taking first and second positions in which said selector connects the main ducts respectively to the main pump and to an unpressurized reservoir for operating the motor, and a neutral position in which said selector isolates said ducts from said pump and from said reservoir for braking the motor, means for connecting a boost duct to the discharge main duct, and two pressure limiters disposed between said main ducts and for limiting the pressure in a respective one of said ducts by diverting excess fluid from said duct into the other duct, the circuit including a relief valve device distinct from said pressure limiters, suitable for taking up a retention position and a relief position in which said device puts one of said main ducts into communication with a relief enclosure, the relief valve device being continuously urged back into one of the said positions thereof by resilient return means and being caused to go into the other position by a control duct connected to one of the main ducts, so that the device is suitable for taking up the relief position thereof when, after the selector has isolated the main ducts from the main pump and from the reservoir, the difference between a pressure in the main duct to which said control duct is connected and a relief pressure higher than a boost pressure changes sign.

2. A circuit according to claim 1, wherein the relief valve device comprises at least one relief valve comprising a pressure limiter having an inlet suitable for being put into communication with the main duct that is at the higher pressure, and an outlet connected to said relief enclosure, the inlet of said limiter communicating with the outlet thereof so as to connect said main duct to the relief enclosure when the pressure in said main duct is at least equal to the relief pressure.

3. A circuit according to claim 2, wherein the relief valve device comprises a relief valve comprising a pressure limiter connected to the two main ducts by a circuit selector suitable for permanently puffing the inlet of said limiter into communication with the main duct that is at the higher pressure.

4. A circuit according to claim 3, including at least one permanent constriction disposed between said circuit selector and said relief valve.

5. A circuit according to claim 4, wherein the boost duct is connected to main ducts distinctly from said relief valve device.

6. A circuit according to claim 2, wherein the relief valve device comprises two relief valves, each of which comprises a pressure limiter connected to one of the main ducts via a control duct.

7. A circuit according to claim 6, including at least two permanent constrictions respectively disposed between each one of said two relief valve and respective main ducts.

8. A circuit according to claim 7, wherein the boost duct is connected to main ducts distinctly from said relief valve device.

9. A circuit according to claim 2, including at least one constriction disposed downstream from or upstream from the relief valve device.

10. A circuit according to claim 1, wherein the relief valve device comprises at least one relief valve having an inlet and a control duct that are connected to one of the main ducts and an outlet that is connected to the relief enclosure, which valve is suitable for taking up a retention position in which said inlet and outlet are isolated from each other, and a relief position in which said inlet and outlet communicate so as to allow fluid to flow from the main duct to which the control duct is connected to the relief enclosure, said relief valve being caused to go into the retention position thereof when a pressure in the main duct to which the control duct is connected is at least equal to the relief pressure, while said relief valve is suitable for taking up the relief position thereof when the pressure in said control duct is lower than the relief pressure.

11. A circuit according to claim 10, wherein the relief valve device comprises two relief valves whose inlets and the control ducts are connected to respective ones of said main ducts.

12. A circuit according to claim 10, wherein the relief valve device comprises a relief valve connected to the main ducts via a connection selector suitable for connecting the inlet of tile relief valve to the control duct at the lower pressure.

13. A circuit according to claim 10, including at least one constriction disposed downstream from or upstream from the relief valve device.

14. A circuit according to claim 1, wherein the relief valve device comprises at least one relief valve having an inlet connected to one of the main ducts, a control duct connected to the other main duct and an outlet connected to the relief enclosure, said valve being suitable, at rest, for taking up the retention position thereof in which said inlet and outlet are isolated from each other, and being suitable, when the pressure in the main duct to which the control duct is connected is at least equal to the relief pressure, for taking up the relief position thereof in which said inlet and outlet communicate with each other in the direction in which the fluid flows from the inlet towards the outlet.

15. A circuit according to claim 14, wherein the relief valve device comprises two relief valves whose inlets are connected to respective ones of said main ducts, the control duct of each relief valve being connected to the main duct, other than the main duct to which the inlet of the relief valve in question is connected.

16. A circuit according to claim 14, wherein the relief valve comprises a relief valve whose inlet is connected to the main ducts via a connection selector suitable for connecting the inlet of the relief valve to the main ducts at the lower pressure and whose control duct is connected to the main ducts via a circuit selector suitable for putting said control duct into communication with the main duct at the higher pressure.

17. A circuit according to claim 14, including at least one constriction disposed downstream from or upstream from the relief valve device.

18. A circuit according to claim 1, including at least one constriction disposed downstream from or upstream from the relief valve device.

19. A circuit according to claim 1, wherein the relief enclosure is formed by the boost duct.

20. A circuit according to claim 1, wherein the relief enclosure comprises one of the enclosures formed by the internal space of the casing of the motor, the internal space of the casing of a boost pump, and an unpressurized reservoir.

* * * * *